Nov. 1, 1932.                    E. C. RICHARDS                    1,886,305
             HOLLOW GRINDER FOR HAMBURGER KNIVES AND THE LIKE
                            Filed Dec. 7, 1931
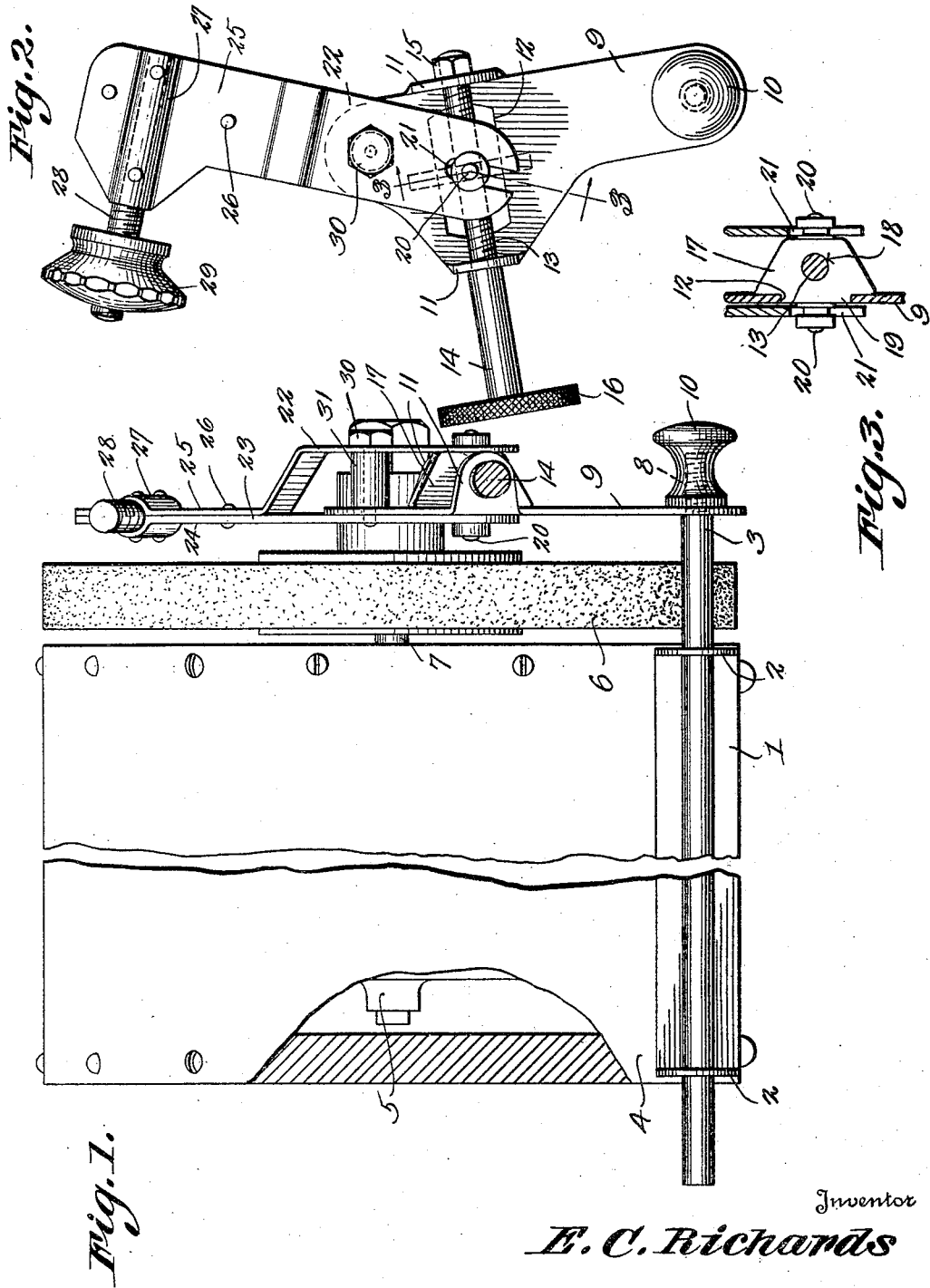
Inventor
E. C. Richards
By C. A. Snow & Co.
Attorneys.

Patented Nov. 1, 1932

1,886,305

UNITED STATES PATENT OFFICE

EDWARD C. RICHARDS, OF FAYETTE, IOWA

HOLLOW GRINDER FOR HAMBURGER KNIVES AND THE LIKE

Application filed December 7, 1931. Serial No. 579,545.

This invention relates to a means whereby hamburger knives and similar devices can be hollow ground.

It is an object of the invention to provide an attachment for use in connection with a motor-driven grinding wheel by means of which a hamburger knife or similar article can be held at a desired angle relative to the periphery of the grinding wheel and can thereafter be shifted across the periphery to insure a smooth grinding action producing a concave surface on the knife.

A further object is to provide an attachment which can be adjusted readily and minutely, the said device being formed of few parts so that it can be sold at a low cost.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawing:

Figure 1 is a side elevation of a portion of a motor housing showing the attachment applied thereto, the adjusting stem being shown in section, a portion of the housing broken away and the knife-clamping nut being removed.

Figure 2 is a side elevation of the complete attachment.

Figure 3 is a section on line 3—3, Figure 2.

Referring to the figures by characters of reference, 1 designates an attaching strip provided with outstanding ears 2 in which a rod 3 is mounted to slide and rotate. This strip 1 is adapted to be securely attached in any suitable manner to the housing 4 of a motor 5 or, under some conditions, it can be attached to the base of a motor which is not housed. In any event the motor has a grinding wheel 6 secured to the shaft 7 thereof so as to be driven by the motor and the rod 3 is supported parallel with the axis of rotation of the wheel but beyond the periphery of said wheel.

Rod 3 has a screw-threaded stem 8 projecting from one end thereof through one end of a main arm 9 and this arm is adapted to be clamped against the end of the rod 3 by a nut 10 which can be in the form of a knob. At a point between its ends, arm 9 has laterally extending spaced ears 11 and between these ears there is formed a slot 12.

Screw 13 is swivelled in ears 11 and is held therein detachably by an enlarged stem 14 projecting from one end thereof and by a nut 15 mounted on the other end of the screw. Stem 14 has a head 16 by means of which it can be rotated readily.

Slidable on arm 9 is a nut 17 provided with a threaded opening 18 through which the screw 13 extends. A portion of the nut projects into slot 12 as shown at 19 so that the nut will thus be guided by the slot as it travels along arm 9.

Oppositely extending studs 20 project from the nut into slots 21 formed in the free ends of a fork 22 at one end of the supplemental arm 23 of the attachment. This supplemental arm consists preferably of two metal strips 24 and 25 held together by rivets 26 or the like and cooperating to form a transverse sleeve 27 in which is fastened one end of a threaded stem 28. This stem is engaged by a clamping nut 29 preferably in the form of a knob. The fork 22 embraces arm 9 and nut 17 and is connected to the arm 9 by a pivot bolt 30. A spacing sleeve 31 is mounted on the bolt between arm 9 and one member of the fork 22, as shown particularly in Figure 1.

In practice the hamburger knife to be sharpened is placed on stem 28 and clamped securely against the end of sleeve 27 by the nut 29. Rod 3 is inserted into the ears 2 and the hamburger knife is placed with one blade extending across and resting upon the periphery of the wheel 6. With the parts thus located the screw 13 is rotated to feed nut 17 toward one or the other of ears 11. This action will cause studs 20, working in slots 21, to swing the supplemental arm 23 about its pivot bolt 30, until the knife blade resting upon the wheel is brought to a predetermined angle for hollow grinding and sharpening. After this adjustment has been completed the motor is started and the wheel 6 will rotate at high speed. The attachment can then be pressed against the wheel and can also be moved laterally so as to draw the blade of the knife across the periphery of the wheel. During this sliding movement the attachment will be guided properly by rod 3 and ears 2.

After the blade has been sharpened following back and forth reciprocation of the attachment, said attachment can be swung back from the wheel and the knife adjusted about stem 28 to bring another blade into position for sharpening, and the attachment then returned to active position to bring the blade against the wheel. Thus all of the blades can be successively sharpened and all of them will be similarly ground due to the initial adjustment of the attachment.

What is claimed is:

1. A knife holder for sharpening apparatus including attaching means, a member slidable and rotatable therein, a main arm movable with said member, a supplemental arm pivotally connected to the main arm, means on the supplemental arm for holding a knife thereon, cooperating means on the arms for adjusting said arms angularly relative to each other, said means including a screw carried by one of the arms, a nut slidably engaging one of the arms and guided thereby, and means for movably connecting the nut to the other arm.

2. A knife holder for sharpening apparatus including attaching means, a member slidable and rotatable therein, a main arm movable with said member, a supplemental arm pivotally connected to the main arm, and having a slotted fork straddling the main arm, a nut guided by and slidable on the main arm, means thereon engaging in the slotted portion of the forked end, a screw carried by the main arm for feeding the nut to adjust the arms angularly relative to each other, and means for fastening a knife to the supplemental arm with its edge parallel with the axis of rotation of the slidable and rotatable member.

In testimony that I claim the foregoing as my own, I have hereto affixed my signature.

EDWARD C. RICHARDS.